United States Patent

[11] 3,591,892

| [72] | Inventor | Theodore H. Fairbanks |
| | | West Chester, Pa. |
| [21] | Appl. No. | 849,805 |
| [22] | Filed | Aug. 12, 1969 |
| [45] | Patented | July 13, 1971 |
| [73] | Assignee | FMC Corporation |
| | | Philadelphia, Pa. |

[54] APPARATUS FOR MAKING NET STRUCTURES
3 Claims, 4 Drawing Figs.

[52] U.S. Cl............................................ 18/13,
264/103, 264/167
[51] Int. Cl............................................ B29f 3/06
[50] Field of Search............................... 18/8 SR, 12
N, 13 A, 13 C, 13 D, 13 E, 13, 13 K, 13 R, 13 N, 13
P, 13 S, 13 T, 13 W; 264/103, 167, DIG. 81

[56] References Cited
UNITED STATES PATENTS
2,919,467   1/1960   Mercer.................... 18/13 X (Q)
3,331,903   7/1967   Mine....................... 18/12 X (N)

Primary Examiner—J. Spencer Overholser
Assistant Examiner—Lucius R. Frye
Attorneys—Thomas R. O'Malley, George F. Mueller and Eugene G. Horsky ABSTRACT: Apparatus for making netlike structures in which groups of streams are extruded along opposite sides of a common plane and are shifted in directions generally parallel to such common plane alternately with the movement of streams from certain of such groups from one side of the common plane to the other thereof.

PATENTED JUL 13 1971  3,591,892

APPARATUS FOR MAKING NET STRUCTURES

The present invention relates to apparatus for making netlike structures.

In U.S. Pat. No. 3,331,903 there is disclosed a method and apparatus for making a net from plastic material by extruding a plurality of pairs of monofilaments of plastic material in such a manner that the filaments in each pair are spaced from each other in a first direction and the pairs of filaments are spaced from each other a given distance in a second direction. The monofilaments of each pair of filaments are revolved, at the moment of their extrusion and before being solidified, about an axis extending between the filaments of each pair of filaments so as to twist the filaments of each pair together and to thus integrally connect the filaments. One of the filaments of each pair of filaments is then moved in a second direction a distance equal to the spacing between pairs of filaments while continuing the extrusion of the filaments, after which pairs of filaments are again revolved as heretofore described. By continuously repeating the above steps and setting the extruded filaments of plastic material, a netlike structure is provided.

In my U.S. Pat. application entitled "Method For Continuously Extruding Netlike Structures," Ser. No. 825,210, filed May 16, 1969, there is disclosed a method of making netlike structures of woven or braided monofilaments using an apparatus similar to that described in U.S. Pat. No. 3,331,903.

Netlike structure produced in accordance with the method described in U.S. Pat. No. 3,331,903 are rather stiff and, in general, do not possess a desired bulk or esthetic appeal which would encourage their use as replacements for conventional woven fabrics. Netlike structures formed by the method disclosed in the above-noted pending U.S. Pat. application also lack bulk and, although such structure have unbonded interlaced strands the strands are free to shift relative to each other when subjected to loads, thus causing distortion of the mesh openings thereof. Accordingly, a primary object of this invention is the provision of a new or improved and more satisfactory apparatus for making netlike structures.

Another object of this invention is to provide an apparatus for making a netlike structure which possesses better strength and/or bulk than conventional netlike structures and is decorative in appearance.

Still another object is an apparatus for making a netlike structure having unbonded interlaced strands which are partially stabilized against excessive shifting relative to each other.

A further object is the provision of a new or improved extrusion apparatus for making netlike structures having multiple strands extending between adjacent strand junctions.

A still further object is the provision of an apparatus for continuously extruding netlike structures which include a pair of webs each having strands and strand junctions in which strands of the two webs are interwoven with each other.

A still further object is to provide an apparatus for making netlike structures formed of a pair of webs having strands and strand junctions in which the strands of one web are linked with each other and interwoven with the strands of the other of such webs.

These and other objects are accomplished in accordance with the present invention by an apparatus in which a plurality of separate groups of spaced streams of strand-forming material are continuously extruded, with the groups being arranged in pairs and the pairs of groups being spaced from each other a given distance along a common plane which extends between the groups of each pair of groups. The groups of streams in each respective pair of groups each have a like number of streams which are extruded at spaced intervals relative to each other and about an axis extending between the groups of streams of each respective pair of groups.

Each pair of groups of streams are revolved about the axis, which extends between the respective groups of each such pair of groups, through an angle equal to at least 180° plus 360°/N, but not equal to a whole number of half turns, where N is the total number of streams in the two groups of the respective pairs of groups. The groups of streams of each pair of groups are moved relatively in directions parallel to the common plane to rearrange at least certain of the groups of streams into pairs with groups having a like number of streams. The streams are set into strands concomitantly with the extrusion thereof and by continuously repeating the above sequence of movements, simultaneously with the extrusion of the groups of streams of strand-forming material, netlike structures having desired patterns of strands and strand junctions are provided.

Relative movement of the groups of each pair of groups is effected, by moving the groups of streams parallel to the common plane, for example, with the groups of streams along one side of the common plane being held stationary or being moved in a direction opposite to the groups of streams along the other side of such common plane. When moved, the groups of streams along the respective sides of the common plane are moved in unison and at the same rate of speed. The groups of streams along one side of the common plane may be moved, however, at a speed different from that of the groups along the opposite side of such common plane. Moreover, the rate of speed of relative movement of the groups of streams may be varied during the method to vary the pattern of strands in the finished netlike structure.

As described above, the groups of streams in each respective pair of groups includes a like number of streams. While all pairs of groups need not contain a like number of streams, it is essential that groups of streams which are extruded along one side of the common plane and which include different numbers of streams be matched by like groups of streams extruded along the opposite side of the common plane so that such like groups of streams may be rearranged into at least two different pairs. For example, alternate groups of a series of groups of streams extruded along each of the opposite sides of a common plane may contain two streams while the groups of streams between such alternate groups may include three streams.

The groups of streams along opposite sides of the common plane which contain like numbers of streams are arranged in pairs and are revolved about an axis extending between the groups of each respective pair of groups of streams. When relatively moved, the groups of streams along one side of the common plane are rearranged into pairs with groups along the other side of the common plane which contain a like number of streams.

As indicated by the term "groups," at least two streams are included in each group and the respective groups of streams of each pair of groups may include an even or odd number of streams. The maximum number of streams in each group of streams will be controlled only by limitations imposed by the apparatus employed in the practice of the method and the ability to maintain the streams of each group in spaced relationship during the extrusion and setting thereof. The spacing between streams in the respective groups and the spacing of such streams from the axis extending between the groups of streams of each respective pair of groups may differ without adversely affecting the results obtained in the practice of the method with the apparatus of the present invention.

When revolved, all of the pairs of groups of streams are moved in the same direction. The rate of speed at which the respective pairs of groups are revolved will depend upon the angle through which each pair of groups of streams is to be revolved, which in turn will depend upon the total number of streams in the two groups of each such pair of groups as well as the particular form of strand junctions desired in the finished netlike structure. All such pairs of groups of streams are revolved at least 180° plus the angle provided by dividing 360° by the total number of streams in each respective pair of groups of streams, but not equal to a whole number of half turns. Thus, a pair of groups, in which each group contains two streams; that is, a total of four streams in a pair of such groups, would be revolved through at least 180° plus 90° or a total of 270°. Similarly, pairs of groups of streams which includes a total of six, eight, 10 and 12 streams would be revolved through an angle of at least 240°, 225°, 216° and 210°, respectively.

The pairs of groups of streams may also be revolved through an angle greater than the minimum angles as described above, provided that none of such pairs of groups is revolved through an angle equal to a whole number of half turns. More particularly, the pairs of groups of streams may be revolved through a further multiple of 180° and/or a further multiple of 360°/N as long as the revolution of such pairs of groups is not equal to a whole number of half turns. For example, a pair of groups of streams having a total of six streams may be revolved through angles which are equal to 360°/6 or 60° plus 360° or a further multiple of 180° for a total of 420°, 600°, etc. Alternatively, such pair of groups of streams may be revolved through an angle equal to 180° plus a further multiple of 360°/6 or 60°, providing the total angle of revolution does not equal a whole number of half turns, such as a total angle of 400°, 460°, 520°, etc. A still further alternative is to revolve such pair of groups of streams through an angle equal to a multiple of 180° plus a multiple of 360°/6 or 60°, as for example, 360° plus 120° or 420°, 480°, etc.

In view of the limitation that the pairs of groups of streams be revolved through an angle which is not equal to a whole number of half turns, it will be apparent that a pair of groups containing four streams, for example, would not be revolved multiples of 360°/4 or 90° which would equal 180° or further multiples of 180°.

When revolving the pairs of groups of streams through an angle which is less than 360°, as may be provided by revolving the same through an angle of 180° plus 360°/N or a further multiple of 360°/N, it is essential that the direction of revolution of the pairs of groups of streams and the direction of relative movement of the groups in the pairs of groups be reversed after the respective alternate movement has been completed. Stated differently, the groups along one or both sides of the common plane which are moved parallel to the common plane are reversed in direction of travel after each revolution of pairs of groups of streams, and the direction of revolution of pairs of groups of streams are also reversed after each movement of groups of streams parallel to the common plane. For example, in the instance where pairs of groups of streams have been revolved in a clockwise direction and the groups along only one side of the common plane have been moved to the left to provide for relative movement between the groups of pairs of groups of streams, the rearranged pairs of groups of streams would now be revolved in a counterclockwise direction and would be followed by the groups along the one side of the common plane being moved to the right.

By following the above procedure, when revolving the pairs of groups of streams through angles of less than 360°, the resulting netlike structure includes strands which are crossed or interlaced with each other into a web having a plain weave pattern, and strands which define a second web in which the strands are interlinked with each other and interlaced with strands of the woven web. If the streams from which the strands in the netlike structure is formed are only partially set and still tacky before contact therebetween or set only after they have contacted, the interlaced and interlinked strands will be bonded together at their locations of crossing so that strong, integral junctions will be provided. On the other hand, if the streams forming the strands of the netlike structure are set, at least on the surface thereof, prior to any contact therebetween, each strand remains independent of the others at their locations of crossing. In this instance, the interlinked strands serve to partially stabilize and, in effect, lock strands of the woven web against movement in certain directions.

More particulating, revolving the pairs of groups of streams through an angle of only 180° plus 360°/N, alternately with the movement thereof in directions parallel to the common plane, in a manner as described above, enables one stream of each group in each of the pairs of groups of streams to maintain the same direction of travel parallel to the common plane. In other words, a stream of a paired group of streams which was moved parallel to the common plane in a leftward direction will continue to be moved in the same leftward direction after the group which includes such streams has been revolved through an angle of only 180° plus 360°/N. Thus, if groups each containing four streams are paired and revolved through an angle of only 180° plus 360°/8 or 225°, two of the strands formed from streams in such groups will merely cross with each other while the remaining six strands will be interlinked with each other. Of the six interlinking strands, three extend in a clockwise direction and three in a counterclockwise direction at their location of linking.

Increasing the angle of revolution of the pairs of groups of streams by a multiple of 360°/N, but still keeping the total angle less than 360°, will cause an increase in the number of strands which are crossed or interlaced with each other while reducing the number of strands which interlink with each other. For example, if groups each containing four strands are paired and revolved through an angle equal to 180° plus twice 360°/8 or a total of 270°, two strands formed from streams in one group will cross with two strands formed from streams of a group in another pair of groups. The remaining two strands from each of these groups will be interlinked, with two extending in a clockwise direction and two in a counterclockwise direction.

Carrying the above example still further, the pairs of groups of streams may be revolved through an angle of 180° plus three times 360°/8 or a total of 315° to provide a resulting netlike structure having junctions in which three strands formed from streams in one group will cross with three strands formed from streams of a group in another pair of groups. In addition, one strand, extending clockwise, and other directed counterclockwise will be interlinked with each other.

It will be apparent that each time the angle through which the pairs of groups of streams are revolved is increased by an amount equal to 360°, /N, the number of strands which are disposed in crossing relationship in the resulting netlike structure is increased by two, while the number of strands which are interlinked with each other is reduced by two. The same effect, as to the number of crossing and interlinked strands, is also present when the angle through which pairs of groups of streams are revolved is equal to a multiple of 180° plus a multiple of 360°/N. Under the latter conditions, however, the strands formed by the streams of two groups of streams are first twisted together at least two half turns, after which the strands formed from the streams of such two groups are disposed in desired crossing and interlinked relationships.

Within the limitations described above, the angle through which the pairs of groups of streams are revolved may be randomly or periodically varied throughout the method. Thus, netlike structures may be made having a like number or different number of strands at various junctions thereof, and/or with the relationship of the number of strands crossing each other and the number of strands which are interlinked at the various junctions also differing. Further, the strands at at least some of the junctions of the netlike structure may be twisted through two or more half turns besides being disposed in crossing and interlinked relationship. As a still further variation, the strands at least certain of the junctions may be bonded to or may be unattached to contacting strands.

More particularly, the apparatus of the present invention includes a plurality of nozzles, each being in the form of a sector of a circle and having a pair of flat sides and an arcuate side. The nozzles are arranged in spaced groups along each of the opposite sides of a common plane, with the nozzles in each such groups having their flat sides disposed in abutting relationship and along the common plane and their arcuate sides together defining a substantially continuous semicircle. Each of the nozzles includes an extrusion orifice to which flowable strand-forming material is delivered and from which such strand-forming material is extruded as continuous streams and set into strands.

The groups of nozzles along one side of the common plane are paired with like groups of nozzles along the opposite side of the common plane and means are provided for relatively shifting the groups of nozzles of the respective pairs of groups in directions parallel to the common plane to rearrange at least some of the groups of nozzles along one side of the common plane into pairs with like groups of nozzles along the other side of such plane. Operative alternately with the shifting means are means for revolving each pair of groups of nozzles about an axis extending centrally thereof.

Relative movement between the groups of nozzles of the respective pairs of groups may be effected, for example, by holding the groups of nozzles along one side of the common plane stationary while the groups of nozzles along the other side of such plane are reciprocated. Preferably, the groups of nozzles along both sides of the common plane are reciprocated in 180° out-of-phase relationship, with the means for revolving each pair of groups of nozzles being operative alternately with each stroke of the nozzle reciprocating means. The nozzle revolving means must be capable of moving each pair of groups of nozzles through an angle equal to at least 180° plus 360°, but not equal to a whole number of half turns, where N is the total number of nozzles in each respective pair of groups of nozzles.

As with conventional apparatus for making netlike structures, suitable means are provided for drawing the finished netlike structure away from the extrusion means itself.

The teachings of the present invention are applicable for use with a variety of materials, which are referred to by the terms "plastic" or "strand-forming material," including materials which are thermoplastic, such as polyamides or superpolyamides, polyesters, polyvinyl chloride, copolymers thereof, polyolefins, cellulose acetates, glass, metals, etc., natural or synthetic rubbers, thermosetting materials or wet-spinnable materials, such as viscose, cupro-ammonium cellulose, or carboxymethyl cellulose. Such materials may include various additives such as stabilizers, dyes, foaming agents, etc., if so desired. It will be apparent that the manner by which the extruded streams are set will depend upon the particular material which is being employed.

For a greater understanding of this invention, reference is made to the following detailed description and drawing in which.

Figure 1:
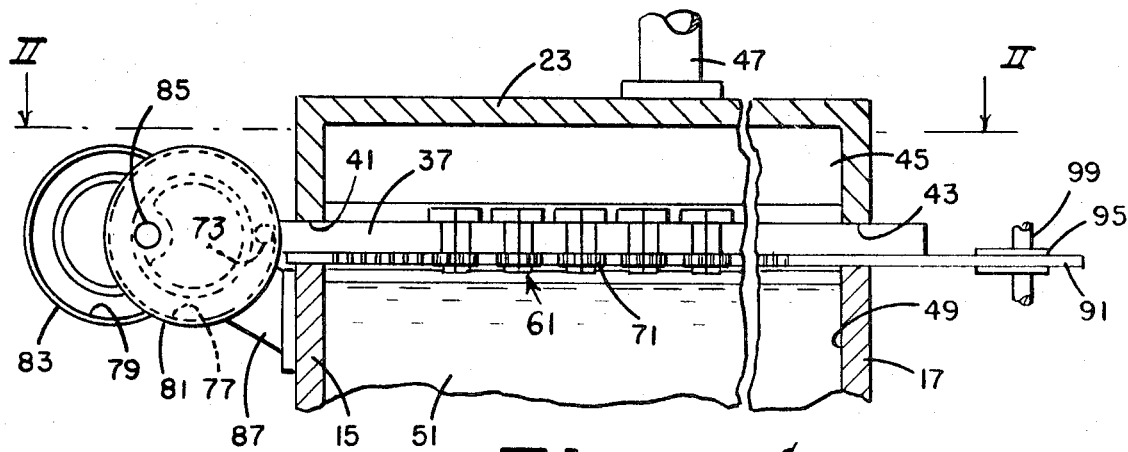
FIG. 1 is a front view of the apparatus of the present invention, with a portion of such apparatus being shown in section.

With reference to the drawing, the apparatus includes a pair of vertical support members 15 and 17, sidewalls 19 and 21, which terminate well above the lowermost end of the support members 15 and 17, and a top wall 23. Flanges 25 and 27 extend inwardly from the lowermost ends of the sidewalls 19 and 21 and cooperate with walls 29 and 31, respectively, projecting from the opposing surfaces of such sidewalls to provide channels 33 and 35. Plates 37 and 39, extending through openings 41 and 43 in the support members 15 and 17, are mounted for sliding movement along the channels 33 and 35 and together with the support members 15 and 17, sidewalls 19 and 21 and top wall 23, defines a closed chamber 45.

A conduit 47 opens into the chamber 45 for delivering flowable strand-forming material thereto from a suitable source, not shown. Gaskets are provided in the area of the openings 41 and 43 in the support members 15 and 17 to prevent leakage of strand-forming material during sliding movement of the plates 37 and 39. A tank 49 is provided for containing a suitable setting liquid 51 in the area below the plates 37 and 39.

In the specific embodiment illustrated, contacting parallel surfaces 53 and 55 of the plates 37 and 39 together defined a common plane and are each formed with a series of like equally spaced, semicircular recesses 57 and 59, respectively. A group of nozzles 61 are positioned within each of the plate recesses 57 and 59 and are adapted to be moved relative thereto, as hereafter described in detail. In the specific apparatus illustrated in the drawing two nozzles 61 are positioned within each of the respective recesses 57 and 59 in the plates 37 and 39. The number of nozzles 61 disposed in the plate recesses 57 and 59 may be varied and all such plate recesses need not contain a like number. It is essential, however, that the groups of nozzles 61 located in the recesses 57 of the plate 37, be adapted to be paired with like groups of nozzles 61 carried by the recesses 59 in the plate 39 in at least two different positions of such plates.

The nozzles 61 shown in the drawing are all of like construction, each having flat walls or sides 63, which are substantially equal to the radii of the plate recesses 57 and 59, and an arcuate wall 65 conforming with the periphery of such plate recesses. Each nozzle 61 has a flange 67, which projects over and rests on the top surface of the respective plates 37 and 39, and an extrusion orifice 69 which extends longitudinally thereof. At like locations along the arcuate walls 65 of the nozzles 61 are provided gear teeth 71.

With the flat sides 63 of the nozzles 61 in the respective plate recesses 57 and 59 disposed in abutting relationship and aligned with the abutting surfaces 53 and 55 of the plates 37 and 39, at least one of such plates, and the groups of nozzles 61 positioned therein, are moved or shifted longitudinally. Preferably, both of the plates 37 and 39 are shifted longitudinally in opposite directions relative to each other. This relative longitudinal movement of the plates 37 and 39 is effected through pins 73 and 75 which project from the respective plates 37 and 39 and ride along grooves 77 and 79 formed in the opposing faces of cams 81 and 83. The cams 81 and 83 are of like construction and are fixed, in 180° out-of-phase relationship, to a shaft 85 which is supported by bearings, such as shown at 87, and is intermittently driven by suitable means, not shown. In the apparatus illustrated, and as more fully described hereafter, the plates 37 and 39 are moved a distance substantially equal to one-half the center-to-center spacing of the respective recesses 57 and 59 so as to move the groups of nozzles 61, which are carried by such plates, into different positions of alignment with each other.

Alternately with the longitudinal sliding movement of the plates 37 and 39, aligned groups of nozzles carried by such plates are together revolved as a unit through an angle or arc of at least 180° plus 360°/N but not equal to a whole number of half turns so that groups of nozzles 61 are moved from the respective plates 37 and 39 to the other thereof and with at least some nozzles of such groups being returned to their respective original recesses. Each revolving movement of the groups of nozzles in the respective recesses 57 and 59 is in a direction opposite to the previous revolving movement of the nozzle groups from such respective recesses and is effected by gear racks 89 and 91 which mesh with the nozzle gear teeth 71 and are intermittently driven, respectively, by segment gears 93 and 95, which are fixed to oscillating shafts 97 and 99. The flanges 25 and 27 are rabbeted at 101 to provide, with the plates 37 and 39, suitable guide channels for the racks 89 and 91. Of particular importance, and for reasons as hereafter described in detail, gear teeth are omitted from along opposing sides of the racks 89 and 91, as indicated at 103 and 105.

Figure 2:
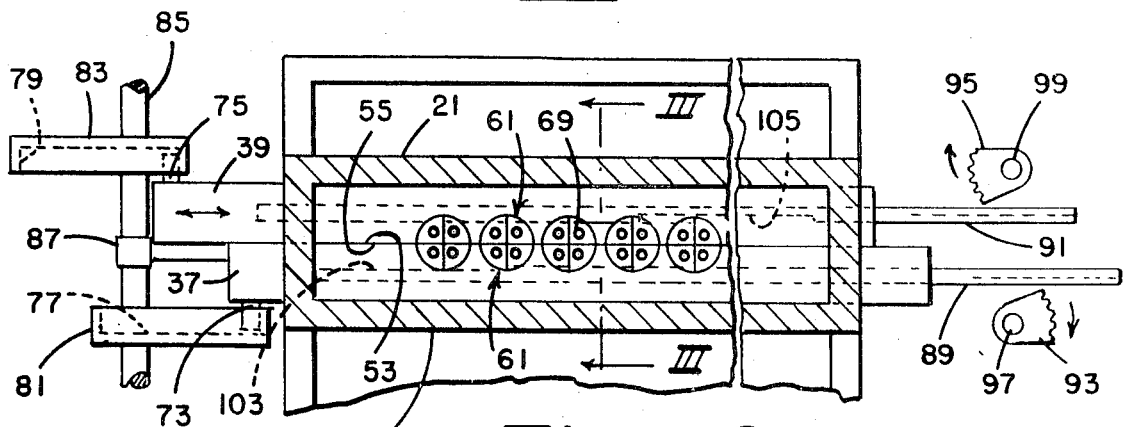
FIG. 2 is a horizontal section taken substantially along the lines II–II of FIG. 1.
Figure 3:
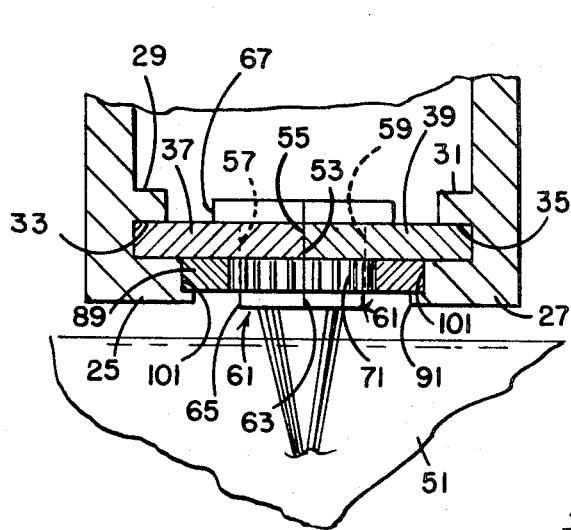
FIG. 3 is a partial vertical section taken transversely through the apparatus substantially along the line III–III of FIG. 2.

With the various elements of the apparatus in stationary, starting positions as shown in FIGS. 1, 2 and 3, a flowable strand-forming material, such as a molten thermoplastic material, is delivered into the chamber 45 and is continuously extruded from the nozzle orifices as streams which are set into strands in the liquid 51, which may be cool water. The cams 81 and 83 are now operated to shift the plates 37 and 39 in opposite directions a distance equal to one-half of the center-to-center spacing of the respective plate recesses 57 and 59 to thus align groups of nozzles 61 in the plates 37 with different groups of nozzles 61 in the plate 39. For example, the plate 37 may be moved to the left, as viewed in FIG. 2, while the plate 39 may be moved to the right to rearrange the groups of nozzles 61 along opposite sides of the common plate, as defined by the plate surfaces 53 and 55, into different pairs of groups. During this movement, streams of strand-forming material are extruded from the nozzle orifices 69 and are merely moved in unison in directions parallel to the common plane which extends between the groups of nozzles of each such pair of groups.

The groups of each such rearranged pair of groups are now revolved by driving the racks 89 and 91 to the left and right respectively, as viewed in FIG. 2. In this manner the groups of nozzles of each pair of groups is revolved in a clockwise direction about an axis between the groups of each respective pair of groups. Groups of nozzles 61 carried by the plates 37 and 39 which are not paired with like grooves in an opposing of such plates will be opposite the portions 103 and 105 of the racks 89 and 91, respectively, which include no gear teeth and thus no revolving movement will be imparted thereto.

The angle through which the groups of nozzles 61 of each pair of such groups are revolved is equal to at least 180° plus 360°/N, where N is the total number of groups in the respective pairs of groups, or a total of 270°. It will be apparent that during the 180° arc of such movement the nozzles 61 of each pair of such groups are transferred from one plate 37 and 39 to the other thereof and thus merely exchange positions. The last 90° arc of this total 270° movement, however, returns one nozzle 61 of each paired group of nozzles 61 to its original plate recesses 57 or 59 but 90° removed from its original position in such recess.

The plates 37 and 39 are now reciprocated by the cams 81 and 83 in the same manner as described above, except in opposite directions to their prior movement. As viewed in FIG. 2, the plate 37 will be moved to the right while the plate 39 is simultaneously moved to the left a distance equal to one-half of the center-to-center spacing between the plate recesses 57 and 59. It will be voted that during this reciprocation of the plates 37 and 39 the nozzles 61 of the paired groups of nozzles which were merely transferred from one of the plates 37 and 39 to the other thereof during the revolving of the pairs of groups of nozzles, travel in the same direction relative to the common plane as they did during the prior reciprocation of such plates.

More particularly, the nozzles 61 in the groups carried by the plate 37 were all moved to the left while the nozzles 61 carried by the plate 39 were all moved to the right during the original reciprocation of the plates 37 and 39. During the subsequent reciprocation of these plates, the plate 37 is moved to the right while the plate 39 is moved to the left. Thus, the nozzles 61 of the paired groups of nozzles which were merely transferred from one plate 37 and 39 during the intervening revolving movement of such pairs of groups will be moved in the same leftward or rightward direction relative to the common plane during both of the reciprocating movements of the plates 37 and 39. The strands which are formed from the streams of strand-forming material extruded from these particular nozzles are indicated at 107 and 109 and, as indicated at A in FIG. 4, the strand 109 overlies the strand 107.

On the other hand, the nozzles 61 of the groups of nozzles which are returned to their original plates 37 and 39 during the revolution of the paired groups of nozzles will travel, during the last-mentioned reciprocation of the plates 37 and 39, in a direction opposite to that in which they were moved during the initial reciprocation of such plates. The strands formed from the streams of strand-forming material extruded from these particular nozzles are indicated at 111 and 113 and, as also illustrated at A in FIG. 4, these strands are interlinked with each other.

Following the second-described reciprocation of the plates 37 and 39 relative to each other, the pairs of groups of nozzles are each revolved by the racks 89 and 91 about the axis extending between the groups of the respective pairs. This movement is in a direction opposite to the previous revolution of the paired groups of nozzles, namely counterclockwise as viewed in FIG. 2. By this movement of the paired groups of nozzles 61, and as shown at B in FIG. 4, the strand 109 now lies under a strand 115 which extends diagonally of the netlike structure and corresponds to the strand 107 heretofore mentioned. Also shown at B in FIG. 4 is the strand 111 interlinked with a strand 117, which is formed in the same manner as the strand 111 as heretofore described.

Reciprocation of the plates 37 and 39 is then effected by shifting the same in directions as initially described and is followed by revolving paired groups of nozzles in a clockwise direction. By repeating the above-described steps, concomitantly with the extrusion and setting of the streams of strand-forming material, a continuous netlike structure is provided having strands and strand junctions as illustrated in FIG. 4.

Figure 4:
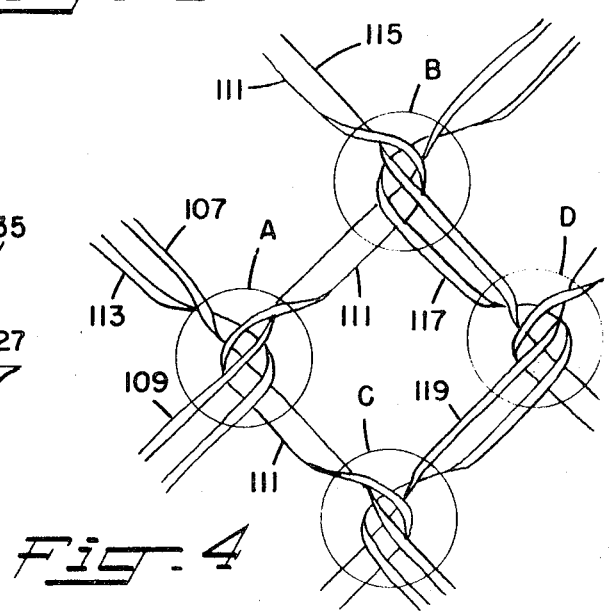
FIG. 4 is a diagrammatic illustration of a portion of one form of netlike structure formed with the apparatus of the present invention.

From the above description, and as shown in FIG. 4, strands 107, 109, 115, etc. extend diagonally of the netlike structure and are interlaced with the strands with which they cross in a web having a plain weave. That is, such diagonal strands each extend over a crossing strand at one junction and then under a crossing strand at an adjacent junction. On the other hand, the strands, such as strands 111, 113, 117, etc. extend along zigzag paths and are interlinked with each other to provide a second web. It will be further noted that the strands 107, 109, 115, etc. pass over and under the strands 111, 113, 117, etc. at the different junctions and the strands of one web are interwoven with strands of the other of such webs.

Of particular importance is that the interlinking strands do restrict shifting of the strands of the woven web relative to each other. Thus, as seen at A in FIG. 4, the strand 107 is capable of shifting relative to the strand 109 in a leftward direction; that is, away from B, but is prevented from any significant movement in the opposite direction by the loop in the strand 113. At this same location the strand 109 is capable of shifting downward, as viewed in FIG. 4, but is obstructed from moving in an upward direction by the loop formed in the strand 111. At location B in FIG. 4, the strand 115, is prevented from moving to the right by the loop in the strand 111, while the strand 109 is restricted in its upward movement by the loop in the strand 117.

By comparing the two strand arrangements at locations A, B, C and D in FIG. 4 it will be also apparent that the crossing relationship of the strands 107, 109, 115, etc., which are part of the woven web, is reversed at the adjacent junctions. For example, at location A, the strand 109 overlies the strand 107, while at location B the strand 109 extends under the strand 115 which extends generally parallel to the strand 107 and diagonally of the netlike structure. At location C a strand 119, which is generally parallel to the strand 109 and extends diagonally of the net structure, lies under the strand 107, while at location D this same strand 119 overlies the strand 115. A similar relationship also exists with the interlinked strands.

If in the practice of the above-described method the extruded streams are brought into contact while still in a tacky condition, the resulting strands will be adhered to each other at the strand junctions. Preferably, however, the streams are set prior to contacting to provide a more flexible netlike structure. Variations from the netlike structure described may be provided, for example, by reciprocating the plates further multiples of the center-to-center spacing between plate recesses 57 and 59 and/or revolving the paired groups of nozzles 1) 360°/N or 90° plus further multiples of 180° or 2) 180° plus further multiples of 360°/N or 90° or 3) further multiples of 180° plus further multiples of 360°/N or 90°.

While the netlike structure formed with the apparatus of the present invention has been described as being formed concomitantly with the manufacture of the strands which are employed in such structure, netlike structures may be produced from preformed strands. In this instance, the preformed strands are merely laced through the nozzle orifices after which such strands and their supply sources are manipulated in accordance with the method as heretofore described.

I claim:

1. Apparatus for making netlike structures including a plurality of nozzles each being in the form of a sector of a circle and having a pair of flat sides and an arcuate side, said nozzles arranged in spaced groups along each of the opposite sides of a common plane with the nozzles in each of said groups having their flat sides disposed in abutting relationship and along the common plane and their arcuate sides together defining a substantially continuous semicircle, the groups of nozzles along one side of the common plane being paired with like groups of nozzles along the opposite side of the common plane, each of said nozzles having an extrusion orifice, means for delivering flowable strand-forming material to the nozzle orifices for extrusion therefrom as continuous streams, means for setting into strands the streams of flowable strand-forming material extruded from the nozzle orifices, means for relatively shifting the groups of nozzles of the respective pairs of groups in directions parallel to the common plane to rearrange at least some of the groups of nozzles along one side of the common plane into pairs with like groups of nozzles along the other side of the common plane, and means operative alternately with said shifting means for revolving each pair of groups of nozzles about an axis extending centrally thereof and to such degree that some but less than all of the nozzles of each paired groups of nozzles are on the same side of the common plane as that which they occupied prior to the revolving thereof.

2. Apparatus as defined in claim 1 wherein said revolving means is adapted to revolve each pair of groups of nozzles through an angle equal to at least 180° plus 360°/N, but not equal to a whole number of half turns, where N is the total number of nozzles in each respective pair of groups of nozzles.

3. Apparatus as defined in claim 1 wherein said shifting means includes means for reciprocating the groups of nozzles along one side of the common plane in 180° out-of-phase relationship with the groups of nozzles along the opposite side of such common plane and wherein said revolving means is operative alternately with each stroke of said reciprocating means.